US010808947B2

(12) United States Patent
Kawamura et al.

(10) Patent No.: US 10,808,947 B2
(45) Date of Patent: Oct. 20, 2020

(54) HEAT SOURCE SYSTEM MANAGING DEVICE, HEAT SOURCE SYSTEM MANAGING METHOD, AND PROGRAM

(71) Applicant: HITACHI, LTD., Tokyo (JP)

(72) Inventors: Tsutomu Kawamura, Tokyo (JP); Kaoru Kawabata, Tokyo (JP); Ryousuke Nakamura, Tokyo (JP); Hiroshige Kikuchi, Tokyo (JP); Susumu Ikeda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/533,675

(22) PCT Filed: Nov. 6, 2015

(86) PCT No.: PCT/JP2015/081246
§ 371 (c)(1),
(2) Date: Jun. 7, 2017

(87) PCT Pub. No.: WO2016/098483
PCT Pub. Date: Jun. 23, 2016

(65) Prior Publication Data
US 2017/0314789 A1     Nov. 2, 2017

(30) Foreign Application Priority Data
Dec. 18, 2014    (JP) .................................. 2014-255862

(51) Int. Cl.
*F24D 11/00*     (2006.01)
*F24F 11/89*     (2018.01)
(Continued)

(52) U.S. Cl.
CPC ........ *F24D 11/004* (2013.01); *F24D 19/1006* (2013.01); *F24F 11/30* (2018.01);
(Continued)

(58) Field of Classification Search
CPC ................................ F24D 11/004; F24F 11/47
(Continued)

(56) References Cited

U.S. PATENT DOCUMENTS 5,408,917 A * 4/1995 Lussi .................... A47J 31/007
219/428
6,591,255 B1 * 7/2003 Tatum ...................... G06N 3/08
706/25

(Continued)

FOREIGN PATENT DOCUMENTS

JP     60-251336 A     12/1985
JP     S60251336 A     12/1985
(Continued)

OTHER PUBLICATIONS

Miyamoto, JP 2008-82642 A English machine translation, Apr. 10, 2008.*
(Continued)

*Primary Examiner* — Edelmira Bosques
*Assistant Examiner* — Phillip Decker
(74) *Attorney, Agent, or Firm* — Volpe and Koenig, P.C.

(57) ABSTRACT

A heat source system managing device includes: a predicted heat demand upper limit calculating unit configured to calculate a predicted heat demand upper limit by adding a prediction error to a predicted heat demand value for a heat source system; an operation plan preparing unit configured to prepare an operation plan of the heat source system to supply heat of the predicted heat demand upper limit to a consuming facility; a surplus stored heat quantity calculating unit configured to repeatedly perform a process of calculating a surplus stored heat quantity by subtracting a heat quantity consumed by the consuming facility from the predicted heat demand upper limit; and an operation plan changing unit configured to sequentially change the opera- (Continued)

tion plan by decreasing a future operation rate of a refrigerator to cancel the surplus stored heat quantity.

5 Claims, 6 Drawing Sheets

(51) Int. Cl.

| | |
|---|---|
| *F28D 20/00* | (2006.01) |
| *F24F 11/47* | (2018.01) |
| *F24F 11/30* | (2018.01) |
| *F24D 19/10* | (2006.01) |
| *F28D 19/00* | (2006.01) |
| *F24F 140/60* | (2018.01) |
| *F24F 130/00* | (2018.01) |
| *F24F 130/10* | (2018.01) |
| *F24F 110/10* | (2018.01) |

(52) U.S. Cl.
CPC ............. *F24F 11/47* (2018.01); *F24F 11/89* (2018.01); *F28D 19/00* (2013.01); *F28D 20/0034* (2013.01); *F24F 2110/10* (2018.01); *F24F 2130/00* (2018.01); *F24F 2130/10* (2018.01); *F24F 2140/60* (2018.01); *Y02E 60/142* (2013.01)

(58) Field of Classification Search
USPC ......................................................... 237/12
See application file for complete search history.

(56) References Cited

U.S. PATENT DOCUMENTS

| | | | |
|---|---|---|---|
| 7,711,655 B2* | 5/2010 | Abe ....................... G06Q 10/06 705/400 |
| 8,538,593 B2* | 9/2013 | Sun ........................... H02J 3/00 700/286 |
| 8,577,512 B2* | 11/2013 | Kaneko ............... F24D 19/1048 700/286 |
| 10,600,135 B2* | 3/2020 | Nakano ................... H02J 13/00 |
| 2001/0018971 A1* | 9/2001 | Tabuchi ................ F24F 5/0017 165/236 |
| 2014/0094980 A1 | 4/2014 | Saito et al. |
| 2014/0371934 A1* | 12/2014 | Kubota ..................... H02J 3/00 700/291 |
| 2016/0169539 A1* | 6/2016 | Deivasigannani .... F24H 9/2007 237/12 |
| 2016/0209857 A1* | 7/2016 | Nakasone ................. H02J 3/32 |
| 2016/0226250 A1* | 8/2016 | Fukubayashi ............. H02J 3/32 |
| 2017/0363315 A1* | 12/2017 | Kawabata ................ F24F 11/46 |
| 2018/0165773 A1* | 6/2018 | Nakano .................. G06Q 50/06 |

FOREIGN PATENT DOCUMENTS

| | | | |
|---|---|---|---|
| JP | 63-251743 A | | 10/1988 |
| JP | S63251743 A | | 10/1988 |
| JP | 06-313605 A | | 11/1994 |
| JP | 08-086492 A | | 4/1996 |
| JP | H0886492 A | | 4/1996 |
| JP | 2008-082642 A | | 4/2008 |
| JP | 2011153741 A | * | 8/2011 |
| JP | 5248897 B2 | * | 7/2013 |
| JP | 2013-174412 A | | 9/2013 |
| JP | 2016114340 A | * | 6/2016 ............. F24F 11/89 |

OTHER PUBLICATIONS

Goto, JP 63-251743 A English machine translation, Oct. 19, 1988.*
Kosugi et al., JP 8-86492 A English machine translation, Apr. 2, 1996.*
Teramoto et al., JP 60-251336 A English machine translation, Dec. 12, 1985.*
Japanese Office Action dated Jul. 3, 2018 for the Japanese Patent Application No. 2014-255862.
International Search Report, PCT/JP2015/081246, dated Feb. 2, 2016, 2 pgs.

* cited by examiner

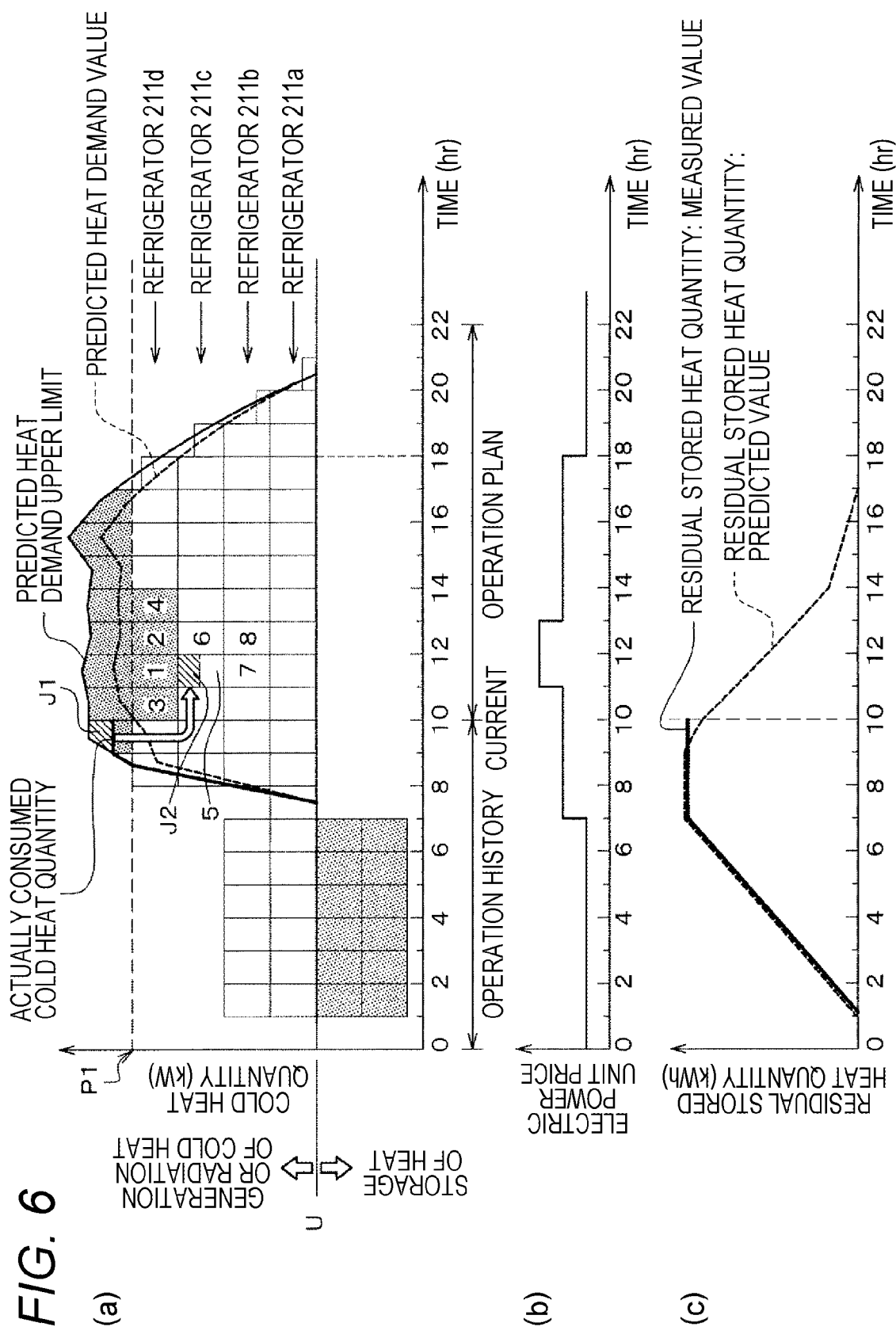

HEAT SOURCE SYSTEM MANAGING DEVICE, HEAT SOURCE SYSTEM MANAGING METHOD, AND PROGRAM

TECHNICAL FIELD

The present invention relates to a heat source system managing device that manages a heat source system, and the like.

BACKGROUND ART

Recently, prevention of global warming has attracted more attention and there is demand for a decrease in emission of $CO_2$ or energy saving. In this regard, in the manufacturing industries, energy saving by reformation of manufacturing processes, introduction of high-efficiency energy saving devices, fuel switching, and the like has been actively tried with the oil crisis as a trigger and thus energy consumption is substantially kept unchanged.

On the other hand, in sectors of housing and business, with spread of life styles in which comfort or convenience is pursued, energy consumption has increased yearly. In the future, there is demand for an increase in efficiency of a heat source system that supplies thermal energy to consuming facilities such as buildings or plants to achieve more energy saving. For example, the following technique is known as a technique for achieving an increase in efficiency of a heat source system.

That is, PTL 1 describes an operation method of heat source equipment in which a current operation state is maintained in a period in which a predicted stored heat quantity after a predetermined time passes is expected not to exceed a predetermined limit range when heat source equipment supplying heat via a heat storage tank operates.

CITATION LIST

Patent Literature

PTL 1: JP 6-313605 A

SUMMARY OF INVENTION

Technical Problem

PTL 1 describes a technique of preparing an operation plan to decrease a start/stop frequency of heat source equipment, but does not particularly describe a technique of using the whole cold heat stored in the heat storage tank on that day.

For example, in the technique described in PTL 1, in order to use the whole cold heat stored in the heat storage tank on that day, it is considered to prepare an operation plan to properly satisfy a predicted heat demand value. However, predicted values of a weather forecast rarely coincide with an actual temperature and the like. When the temperature on the next day or the like is higher than a predicted value of the weather forecast, there is a possibility that sufficient cold heat will not be supplied to a load with the cold heat stored in the heat storage tank.

In the technique described in PTL 1, it can also be considered that cold heat over the predicted heat demand value is generated by heat source equipment and the cold heat is supplied to consuming facilities with a margin. However, when an actual temperature or the like is equal to or less than the predicted value of the weather forecast, a part of the cold heat generated by the heat source equipment is useless and energy efficiency of the system as a whole decreases greatly.

Therefore, an object of the invention is to provide a heat source system managing device that can enhance energy efficiency of a heat source system, and the like.

Solution to Problem

In order to solve the object, a heat source system managing device according to the present invention includes: a predicted heat demand upper limit calculating unit configured to calculate a predicted heat demand upper limit by adding a predetermined prediction error to a predicted heat demand value for a heat source system including one or more heat source devices and a heat storage tank storing cold heat or hot heat generated by the one or more heat source devices; an operation plan preparing unit configured to prepare an operation plan of the heat source system to supply heat of the predicted heat demand upper limit to a load of the heat source system; a surplus stored heat quantity calculating unit configured to repeatedly perform a process of calculating a surplus stored heat quantity by subtracting a heat quantity consumed by the load from the predicted heat demand upper limit in a heat radiating operation of radiating heat from the heat storage tank to the load in accordance with the operation plan; and an operation plan changing unit configured to sequentially change the operation plan by decreasing a future operation rate of the one or more heat source devices to cancel the surplus stored heat quantity.

Advantageous Effects of Invention

According to the invention, it is possible to provide a heat source system managing device that can enhance energy efficiency of a heat source system, and the like.

BRIEF DESCRIPTION OF DRAWINGS

FIG. 6(a) is a diagram illustrating a change of a cold heat quantity which is consumed in consuming facility in a heat radiating operation, FIG. 6(b) is a diagram illustrating an electric power unit price for each time zone, and FIG. 6(c) is a diagram illustrating a predicted value of the residual stored heat quantity and a measured value of the residual stored heat quantity.

DESCRIPTION OF EMBODIMENTS

Embodiment

Figure 1:
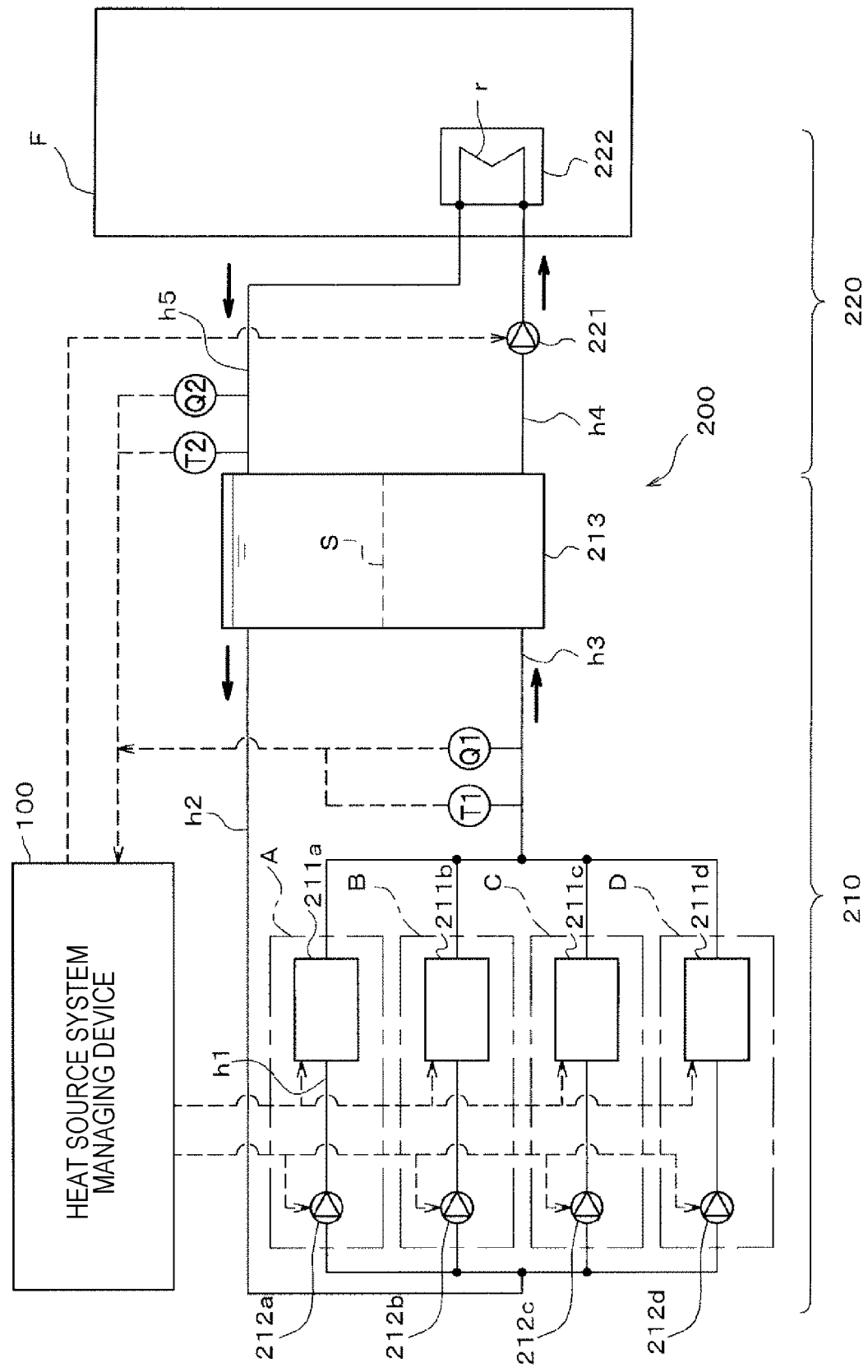
FIG. 1 is a diagram illustrating a configuration including a heat source system managing device according to an embodiment of the invention.

FIG. 1 is a diagram illustrating a configuration including a heat source system managing device 100 according to an embodiment of the invention. Solid arrows in FIG. 1 indicate directions of cold water flowing in pipes, and dotted arrows indicate signal lines. Hereinafter, a heat source system 200 which is a management target of the heat source system managing device 100 will be first described and then the heat source system managing device 100 will be described in detail.

<Configuration of Heat Source System>

The heat source system 200 is a system that supplies cold heat to water which is a "heat medium" using a refrigerator 211a and the like and supplies the cold heat to a consuming facility F (such as a building or a plant) via a heat storage tank 213. The heat source system 200 includes a primary system 210 that generates cold heat and stores the generated cold heat in the heat storage tank 213 and a secondary system 220 that consumes the cold heat stored in the heat storage tank 213.

(Primary System)

The primary system 210 includes four primary units A, B, C, and D and the heat storage tank 213.

The primary unit A includes a refrigerator 211a (a heat source device) and a primary cold water pump 212a. The refrigerator 211a is, for example, a turbo refrigerator and is a cold heat source that supplies cold heat to cold water flowing via a pipe h1. The primary cold water pump 212a is a pump that feeds cold water from the heat storage tank 213 to the refrigerator 211a and is installed upstream from the refrigerator 211a.

The other primary units B, C, and D have the same configuration as the primary unit A. The refrigerators 211a to 211d may have different characteristics (for example, power consumption characteristics to be described later: see FIG. 3), and may have the same characteristics.

As illustrated in FIG. 1, the four primary units A to D are connected in parallel. The upstream side of the primary units A to D is connected to an upper part of the heat storage tank 213 via a pipe h2. The downstream side of the primary units A to D is connected to a lower part of the heat storage tank 213 via a pipe h3. Cold water fed via the pipe h2 from the upper part of the heat storage tank 213 is cooled by the refrigerator 211a or the like and the cooled cold water flows into the lower part of the heat storage tank 213 via the pipe h3.

The primary units A to D can operate individually. For example, on the basis of an operation plan to be described later, only the primary unit A may operate or all of the primary units A to D may operate.

The heat storage tank 213 is, for example, a temperature-stratified heat storage tank and serves to store cold heat by storing cold water cooled by the refrigerator 211a or the like. In addition, as the temperature of cold water is lower, the cold water has a larger density and thus is more likely to subside. Accordingly, cold water stored in the heat storage tank 213 has a temperature gradient in the vertical direction and the temperature thereof becomes lower toward the downside. In FIG. 1, a temperature interface S between cold water of a relatively high temperature (for example, 12° C.) and cold water of a relatively low temperature (for example, 5° C.) subsiding lower than the cold water is illustrated.

(Secondary System)

The secondary system 220 includes a secondary cold water pump 221 and a thermal load device 222 (load).

The secondary cold water pump 221 is a pump that feeds cold water from the heat storage tank 213 to the thermal load device 222 and is installed in a pipe h4 upstream from the thermal load device 222.

The thermal load device 222 is, for example, a heat exchanger that cools indoor air of a consuming facility F and is installed in the consuming facility F. Cold heat supplied from the heat storage tank 213 is consumed by causing cold water of a low temperature to exchange heat with indoor air via a heat transfer pipe r of the thermal load device 222.

As illustrated in FIG. 1, an upstream side of the heat transfer pipe r is connected to the lower part of the heat storage tank 213 via a pipe h4. The downstream side of the heat transfer pipe r is connected to the upper part of the heat storage tank 213 via a pipe h5. Cold water fed from the lower part of the heat storage tank 213 via the pipe h4 exchanges heat with indoor air in the heat transfer pipe r and cold water of which the temperature increases by the heat exchange flows into the upper part of the heat storage tank 213 via the pipe h5.

The refrigerators 211a to 211d, the primary cold water pumps 212a to 212d, and the secondary cold water pump 221 operate in accordance with an operation plan which is prepared (or changed) by the heat source system managing device 100 to be described later.

(Temperature Detector/Flow Rate Detector)

A temperature detector T1 is a sensor that detects a temperature of cold water cooled by the refrigerator 211a or the like and is installed in the pipe h3. A temperature detector T2 is a sensor that detects a temperature of cold water of which the temperature has increased by heat exchange in the thermal load device 222 and is installed in the pipe h5. The detection values of the temperature detectors T1 and T2 are input to the heat source system managing device 100.

A flow rate detector Q1 is a sensor that detects a flow rate of cold water cooled by the refrigerator 211a or the like and is installed in the pipe h3. A flow rate detector Q2 is a sensor that detects a flow rate of cold water of which the temperature has increased by heat exchange in the thermal load device 222 and is installed in the pipe h5. The detection values of the flow rate detectors Q1 and Q2 are input to the heat source system managing device 100.

<Configuration of Heat Source System Managing Device>

Figure 2:
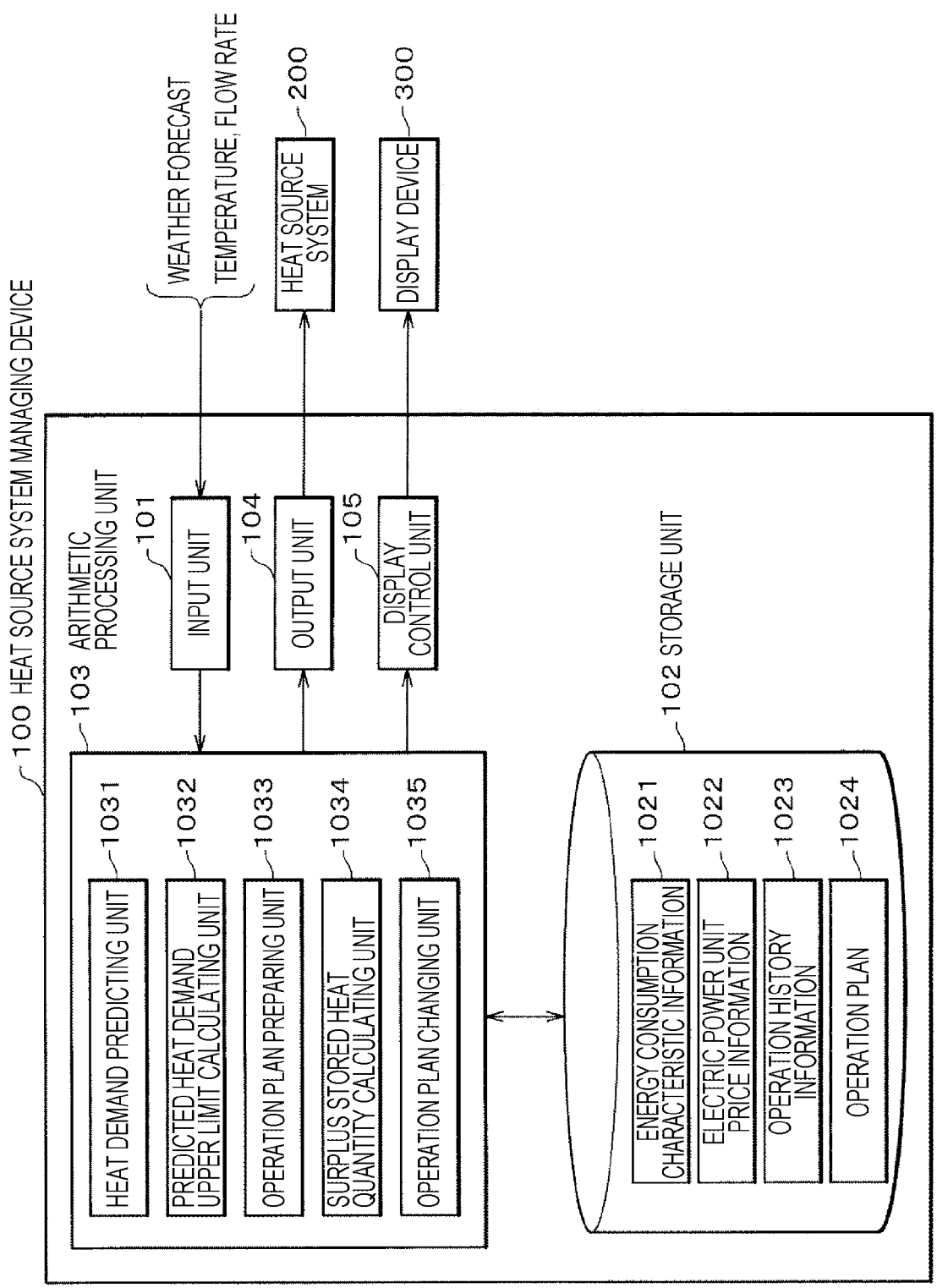
FIG. 2 is a functional block diagram of the heat source system managing device.

FIG. 2 is a functional block diagram of the heat source system managing device 100.

The heat source system managing device 100 is a device that prepares an operation plan of the heat source system 200 on the basis of a weather forecast and outputs a control command based on the operation plan to the refrigerators 211a to 211d, the primary cold water pumps 212a to 212d, and the secondary cold water pump 221. The heat source system managing device 100 also has a function of sequentially changing the operation plan on the basis of the detection values of the temperature detectors T1 and T2 and the flow rate detectors Q1 and Q2.

The heat source system managing device 100 includes electronic circuits such as a central processing unit (CPU), a read only memory (ROM), a random access memory (RAM), and various interfaces, a program stored in the ROM is read and loaded into the RAM, and the CPU performs various processes.

As illustrated in FIG. 2, the heat source system managing device 100 includes an input unit 101, a storage unit 102, an arithmetic processing unit 103, an output unit 104, and a display control unit 105.

The input unit 101 has a function of outputting input information to the arithmetic processing unit 103 when a weather forecast, the detection values of the temperature detectors T1 and T2, the detection values of the flow rate detectors Q1 and Q2, and the like are input. The weather forecast includes a predicted temperature value and a predicted humidity value. For example, weather information obtained by predicting temperature and humidity every hour for 24 hours is transmitted to the heat source system managing device 100 periodically (for example, every six hours).

The storage unit 102 stores energy consumption characteristic information 1021, electric power unit price information 1022, operation history information 1023, and information including an operation plan 1024. A magnetic disk device, an optical disc device, a semiconductor storage device, or the like can be used as the storage unit 102.

The energy consumption characteristic information 1021 is information on energy consumption characteristics indicating a relationship between load factors of the refrigerators 211a to 211d (see FIG. 1) and power consumption. For example, the "load factor" of the refrigerator 211a is a ratio of a cold heat quantity generated by the refrigerator 211a to cooling capacity (a cold heat quantity) in rated operation of the refrigerator 211a.

Figure 3:
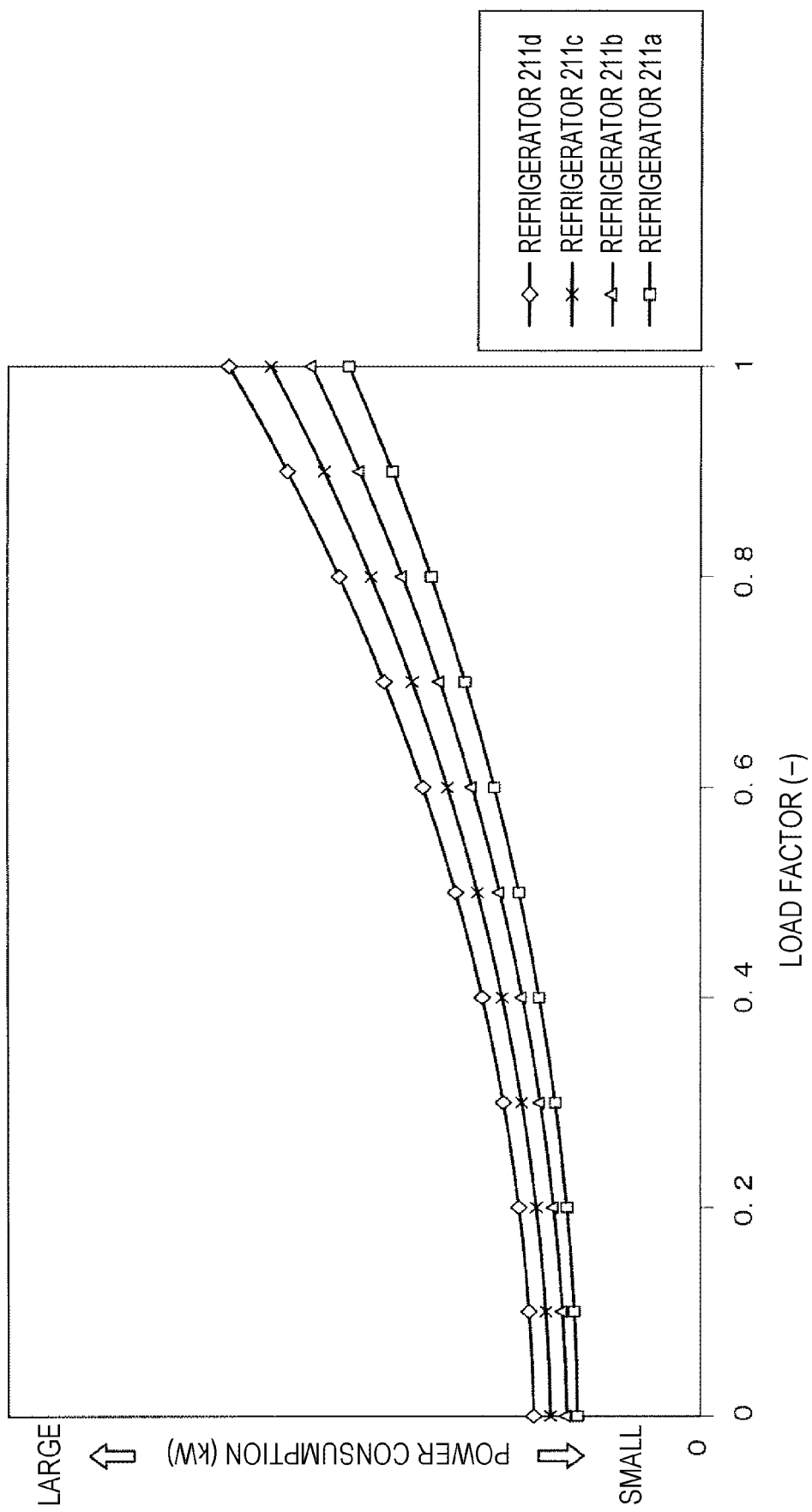
FIG. 3 is a diagram illustrating energy consumption characteristics of four refrigerators.

FIG. 3 is a diagram illustrating energy consumption characteristics of the refrigerators 211a to 211d. As illustrated in FIG. 3, the energy consumption characteristics of the refrigerator 211a or the like exhibit a curved shape which is convex downward and the power consumption of the refrigerator 211a and the like increases as the load factor increases. The energy consumption characteristics are acquired by experiment or simulation in advance and are stored, for example, as a predetermined function, in the storage unit 102 (see FIG. 2) in advance.

The energy consumption characteristics of the refrigerator 211a or the like vary depending on the temperature of a coolant supplied to the refrigerator 211a or the like. Since the temperature of the coolant is affected by outdoor air temperature or humidity, the energy consumption characteristics of the refrigerator 211a or the like vary depending on the outdoor air temperature or humidity.

As illustrated in FIG. 3, the power consumption of the refrigerator 211a is lower than the power consumption of the other refrigerators 211b to 211d at an arbitrary load factor. That is, the refrigerator 211a has the highest energy efficiency among four refrigerators 211a to 211d. It can be seen from the positional relationship of the curves illustrated in FIG. 3 that the efficiency decreases in the order of the refrigerators 211a, 211b, 211c, and 211d.

For example, in the refrigerator 211a, as the load factor increases, a variation (gradient) of the power consumption with respect to the variation in the load factor increases. That is, it can be seen that the larger the load factor becomes, the higher the energy efficiency of the refrigerator 211a becomes and the energy efficiency is the highest in rated operation (load factor=1). The same is true of the other refrigerators 211b to 211d. Accordingly, in this embodiment, the refrigerator 211a or the like basically operate regularly and the operation in a partial load is appropriately performed if necessary.

The electric power unit price information 1022 illustrated in FIG. 2 is a power rate when power of 1 kWh is consumed for the refrigerator 211a to operate, and is set in advance by a contract with a power company. In general, a night power rate is low and a daytime power rate is high (see FIG. 5(b)).

The operation history information 1023 illustrated in FIG. 2 is information indicating a previous operation history of the refrigerators 211a to 211d. Specifically, the operation history information 1023 includes a previous date and time in which the refrigerators 211a to 211d operated, temperature and humidity of the day (for example, every hour), and a cold heat quantity consumed in a consuming facility F.

The operation plan 1024 is an operation plan which is prepared by an operation plan preparing unit 1033 to be described later. The operation plan is sequentially changed by an operation plan changing unit 1035 in operation of the heat source system 200. Preparing and changing of the operation plan will be described later.

The arithmetic processing unit 103 has a function of performing various arithmetic processes. The arithmetic processing unit 103 includes a heat demand predicting unit 1031, a predicted heat demand upper limit calculating unit 1032, the operation plan preparing unit 1033, a surplus stored heat quantity calculating unit 1034, and the operation plan changing unit 1035.

The heat demand predicting unit 1031 predicts a thermal load (a cooling load) of the consuming facility F on the basis of the weather forecast acquired via the input unit 101 and the previous operation history information 1023. This process is performed whenever weather forecast is transmitted, and in this embodiment, it is assumed that heat demand of the day is predicated at midnight once a day.

The heat demand predicting unit 1031 extracts, for example, a plurality of heat demand reports in which the temperature and humidity is similar to the temperature and humidity predicted by the weather forecast among the previous heat demand reports included in the operation history information 1023. Then, the heat demand predicting unit 1031 predicts the heat demand of the next day by averaging the extracted previous heat demand reports.

The method of predicting heat demand is not limited thereto, but the heat demand may be calculated, for example, on the basis of previous weather forecasts, a set temperature of an indoor unit (the thermal load device 222), and a structure of a building constituting the consuming facility F. A device that predicts heat demand (not illustrated) may be provided separately from the heat source system managing device 100 and the heat demand may be received from the device via the input unit 101.

The predicted heat demand upper limit calculating unit 1032 calculates a predicted heat demand upper limit value by adding a predetermined prediction error to the predicted heat demand value calculated by the heat demand predicting unit 1031. The "prediction error" refers to an error between the heat demand value predicted by the heat demand predicting unit 1031 and the cold heat quantity which is actually consumed in the consuming facility F. The value of the prediction error (for example, 10% of the predicted heat demand value) is set in advance on the basis of a comparison result of the previous predicted heat demand values included in the operation history information 1023 with the operation history.

The prediction error is set such that the actual heat demand is not greater than the predicted heat demand upper limit even when the temperature is higher than the value predicted in the weather forecast. In addition, since the predicted heat demand values are different at the times of the period which is a prediction target (see a dotted line in FIG. 5(a)), the predicted heat demand upper limits obtained by adding a predetermined prediction error to the predicted values are different from the times (see a solid line in FIG. 5(b)).

The operation plan preparing unit 1033 illustrated in FIG. 2 prepares an operation plan of the heat source system 200 such that heat of the predicted heat demand upper limit is supplied to the consuming facility F. That is, the operation plan preparing unit 1033 prepares the operation plan such that cold heat which is greater than the predicted heat demand value can be supplied to the consuming facility F with a predetermined margin (the prediction error).

The operation plan includes an operation mode (a heat storing operation mode and a heat radiating operation mode) of the heat source system 200, a time zone in which the operation mode is executed, and information for specifying start/stop of the primary units A to D.

The "heat storing operation mode" is an operation mode in which cold heat is supplied to cold water by the refrigerator 211a or the like and the cold heat is stored in the heat storage tank 213.

The "heat radiating operation mode" is an operation mode in which cold heat stored in the heat storage tank 213 is radiated to the consuming facility F. The "heat radiating operation mode" includes a case in which cold heat is supplied to the consuming facility F while operating the refrigerator 211a or the like (so-called tracking operation) and a case in which cold heat is supplied to the consuming facility F in a state in which all the refrigerators 211a to 211d are stopped.

The surplus stored heat quantity calculating unit 1034 illustrated in FIG. 2 calculates a surplus stored heat quantity by subtracting a cold heat quantity consumed by the consuming facility F from the predicted heat demand upper limit in the heat radiating operation which is performed in accordance with the operation plan. Since the cold heat quantity consumed by the consuming facility F in the heat radiating operation is generally smaller than the predicted heat demand upper limit, the corresponding cold heat quantity remains. The remaining cold heat quantity is the surplus stored heat quantity. The surplus stored heat quantity calculating unit 1034 repeatedly performs the process of calculating the surplus stored heat quantity with a predetermined cycle (for example, every hour) in the heat radiating operation.

The operation plan changing unit 1035 sequentially changes the operation plan by decreasing a future operation rate of the refrigerator 211a or the like to cancel the surplus stored heat quantity. The process which is performed by the operation plan changing unit 1035 will be described later.

The output unit 104 outputs a control command based on the operation plan prepared by the operation plan preparing unit 1033 or the operation plan changed thereafter by the operation plan changing unit 1035 to the devices of the heat source system 200.

The display control unit 105 displays the operation history information or the operation plan, or the like on the display device 300 in response to an operation using a mouse or a keyboard.

<Operation of Heat Source System Managing Device>

Figure 4:
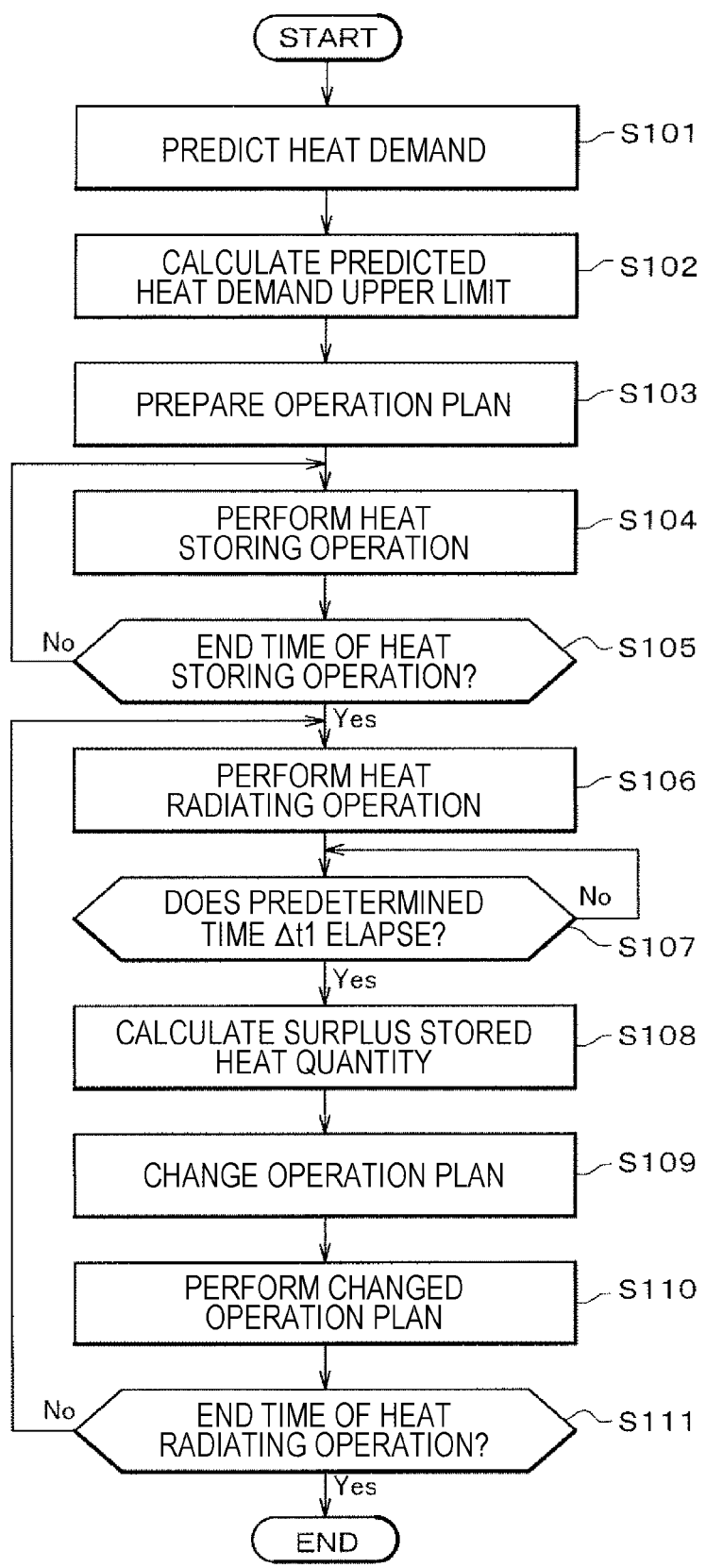
FIG. 4 is a flowchart illustrating a process which is performed by the heat source system managing device.

FIG. 4 is a flowchart illustrating a process which is performed by the heat source system managing device 100. It is assumed that the time of "START" in FIG. 4 is, for example, the midnight and a weather forecast corresponding to 24 hours (every hour) of the day is transmitted.

In Step S101, the heat source system managing device 100 predicts heat demand of the day using the heat demand predicting unit 1031. For example, the heat source system managing device 100 predicts heat demand in each hour of the day for 24 hours.

FIG. 5(a) is a diagram illustrating an operation plan of the heat source system 200. In FIG. 5(a), 0 o'clock (the time of "START" in FIG. 4) denotes a current time. The horizontal axis in FIG. 5(a) represents the time of the day, and the vertical axis represents a cold heat quantity. The lower part of a straight line U in FIG. 5(a) denotes a cold heat quantity which is stored in the heat storage tank 213 through the heat storing operation. The upper part of the straight line U denote a cold heat quantity which is generated by the refrigerator 211a or the like or a cold heat quantity which is radiated from the heat storage tank 213 to the consuming facility F.

In the example illustrated in FIG. 5(a), as indicated by a dotted line (the predicted heat demand value), it is predicted that the heat demand increases rapidly from 7:00 to 8:30, increases slowly from 8:00 to 15:00, and decreases after 15:00.

A plurality of rectangular areas illustrated in FIG. 5(a) indicate cold heat quantities which are generated by the refrigerators 211a to 211d in a predetermined time zone. The first step above the straight line U indicates a cold heat quantity which is generated by the refrigerator 211a, and the second, third, and fourth steps indicate cold heat quantities which are generated by the refrigerators 211b, 211c, and 211d. For example, the area of the rectangular area indicated by reference sign W1 denotes a cold heat quantity which is generated by the refrigerator 211a from 2:00 to 3:00.

In Step S102 in FIG. 4, the heat source system managing device 100 calculates a predicted heat demand upper limit at each time (every hour) using the predicted heat demand upper limit calculating unit 1032 (a predicted heat demand upper limit calculating step). That is, the heat source system managing device 100 calculates the predicted heat demand upper limit by adding the predetermined prediction error (for example, 10% of the predicted heat demand value: see FIG. 5(a)) to the predicted heat demand value calculated in Step S101. The solid line illustrated in FIG. 5(a) denotes a change of the predicted heat demand upper limit at each time.

In Step S103 in FIG. 4, the heat source system managing device 100 prepares an operation plan of the day of the heat source system 200 using the operation plan preparing unit 1033 (an operation plan preparing step). First, the heat source system managing device 100 divides a period (a day) which is a target of the operation plan into a plurality of time zones (every hour) and calculates a generation cost of cold heat in each time zone (a generation cost per unit heat quantity) for each of the refrigerators 211a to 211d. Then, the heat source system managing device 100 prepares an operation plan to preferentially operate the refrigerator having a smaller generation cost of cold heat.

Figure 5:
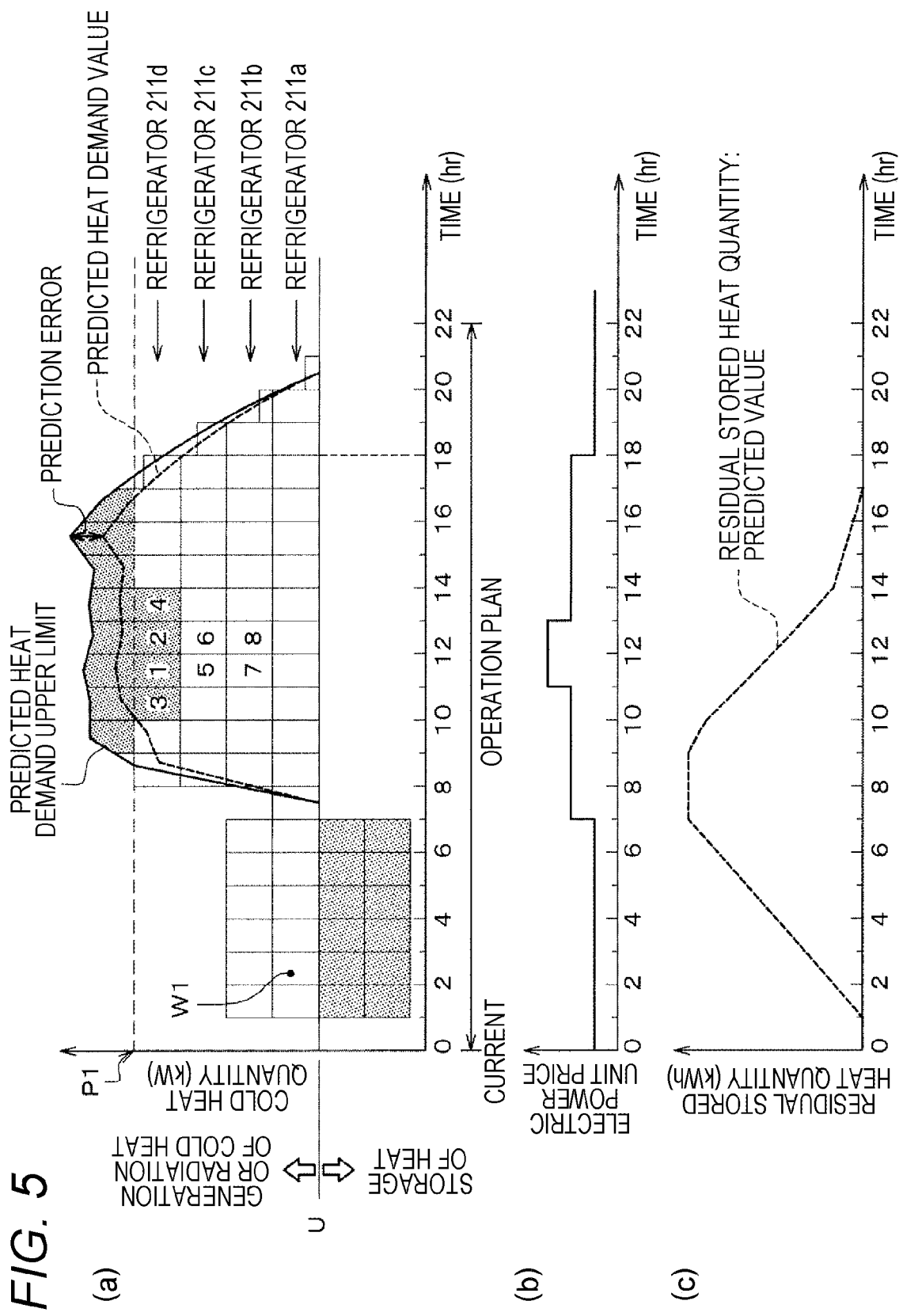
FIG. 5(a) is a diagram illustrating an operation plan of a heat source system.
FIG. 5(b) is a diagram illustrating an electric power unit price for each time zone.
FIG. 5(c) is a diagram illustrating a predicted value of a residual stored heat quantity.

FIG. 5 (b) is a diagram illustrating an electric power unit price of each time zone. In the example illustrated in FIG. 5(b), the electric power unit price at night (from 18:00 to 07:00 of the next day) is lower than that in the daytime. The operation plan is prepared such that the heat storing operation is performed using the inexpensive night electric power and the heat radiating operation is performed in the daytime.

First, the operation plan of the heat storing operation will be described below. The heat source system managing device 100 calculates the generation cost of cold heat in each time zone for each of the refrigerators 211a to 211d, on the assumption that the refrigerators 211a to 211d operate with a rated load at night (up to 07:00) in which the electric power unit price is low. The generation cost of cold heat is calculated by multiplying power consumption when the refrigerator 211a and the like operate regularly (see the vertical axis in FIG. 3) by the electric power unit price (see FIG. 5(b)) and dividing the resultant value by the generated cold heat quantity.

As described above, since the energy efficiency of the refrigerator 211a is the highest (see FIG. 3), the refrigerator 211a has the lowest generation cost of cold heat in each time zone. Similarly, according to the energy consumption characteristics illustrated in FIG. 3, the generation cost of cold heat increases in the order of refrigerators 211a, 211b, 211c, and 211d.

In the operation plan illustrated in FIG. 5(a), only the refrigerators 211a and 211b operate regularly from 01:00 to 07:00 such that a predetermined quantity of cold heat is stored in the heat storage tank 213 (for example, to approach a full capacity). In addition, the area of the shadow part below the straight line U denotes a cold heat quantity which is stored in the heat storage tank 213.

The operation plan in the heat radiating operation will be described below. First, the heat source system managing device 100 calculates a cold heat quantity which is generated when the refrigerators 211a to 211d operate on the basis of the predicted heat demand upper limit on the assumption that cold heat stored in the heat storage tank 213 is not used. Then, the heat source system managing device 100 prepares the operation plan such that the refrigerator 211a or the like having a lower generation cost of cold heat operates preferentially.

For example, in a period from 07:00 to 08:00 in FIG. 5(a), the operation plan is prepared such that only the refrigerator 211a having the lowest generation cost of cold heat operates regularly. In a period from 08:00 to 09:00 in which the heat demand increases rapidly, the operation plan is prepared such that all the refrigerators 211a to 211d operate regularly. The cold heat quantity P1 illustrated in FIG. 5(a) denotes a cold heat quantity which is generated per unit time when all the refrigerators 211a to 211d operate regularly.

In the example illustrated in FIG. 5(a), in a period from 09:00 to 17:00, the predicted heat demand upper limit is greater than the cold heat quantity P1. The short cold heat quantity (hereinafter referred to as a cold heat quantity shortage) is calculated by subtracting the cold heat quantity generated by the refrigerator 211a and the like in the heat radiating operation from a value obtained by integrating the predicted heat demand upper limit with respect to time.

As illustrated in FIG. 5(a), the cold heat quantity shortage (the area surrounded with the straight line of the cold heat quantity P1 and the curve of the predicted heat demand upper limit) is smaller than the cold heat quantity stored in the heat storage tank 213 (the area of the shaded part below the straight line U). That is, when the refrigerator 211a or the like operates as much as possible on the basis of the predicted heat demand upper limit, cold heat remains. The operation plan is prepared to cancel the remaining cold heat by temporarily stopping the refrigerator 211d or the like.

The priority of the refrigerators which are temporarily stopped in the heat radiating operation will be described below.

The heat source system managing device 100 calculates the generation cost of cold heat when the heat radiating operation is performed for each of the refrigerators 211a to 211d. The heat source system managing device 100 ranks combinations of the time zone in which the heat radiating operation will be performed (the time zone obtained by dividing the period from 07:00 to 21:00 every hour in FIG. 5(a)) and the refrigerators operating in the time zone from the highest generation cost of cold heat.

For example, as illustrated in FIG. 3, when a rated operation (load factor=1) is performed, the refrigerator 211d has the lowest efficiency. As illustrated in FIG. 5(b), the electric power unit price in the period from 11:00 to 13:00 is higher than those of the other time zones. When the refrigerator 211d operates in the period from 11:00 to 13:00, the power cost increases and thus it is preferable that the refrigerator 211d stop in the time zones.

Accordingly, in the example illustrated in FIG. 5(a), the combination of the time zone from 11:00 to 12:00 and the refrigerator 211d is ranked by 1, and the combination of the time zone from 12:00 to 13:00 and the refrigerator 211d is ranked by 2. When the combinations include combinations having the same generation cost of cold heat, for example, a rule of setting an earlier time zone to a higher rank is established.

Similarly, the heat source system managing device 100 ranks the combinations of the time zone and the refrigerator, for example, by 1 to 8 (see numerals in rectangles in FIG. 5(a)). In this way, the heat source system managing device 100 prepares the operation plan to preferentially stop the refrigerator having a higher generation cost of cold heat when selecting the refrigerator to be stopped in the heat radiating operation.

In the example illustrated in FIG. 5 (a), when the refrigerator 211d is stopped in the period from 10:00 to 14:00 to correspond to ranks 1 to 4, it is predicted that the cold heat stored in the heat storage tank 213 can be fully used on the day when there is heat demand of the predicted heat demand upper limit.

The cold heat quantity which is stored in the heat storage tank 213 through the heat storing operation (the area of the shaded part below the straight line U) and the cold heat quantity which is supplied to the consuming facility F through the heat radiating operation (the area of the shaded part above the straight line U) are equal to each other. Ranks 5 to 8 illustrated in FIG. 5 (a) are used to change the operation plan to be described later (S109: see FIG. 4).

FIG. 5(c) is a diagram illustrating a predicted value of a residual stored heat quantity. As indicated by a dotted line in FIG. 5 (c), it is predicted that the residual stored heat quantity of the heat storage tank 213 increases in the time zones from 01:00 to 07:00 in which the heat storing operation is performed, decreases slowly by heat radiation thereafter, and then becomes zero when the heat radiating operation ends (at 17:00).

Description will be continuously made again with reference to FIG. 4.

In Step S104, the heat source system managing device 100 performs the heat storing operation on the basis of the operation plan prepared in Step S103. As illustrated in FIG. 6(b), the heat source system managing device 100 operates the refrigerators 211a and 211b and the primary cold water pumps 212a and 212b to perform the heat storing operation at night (from 01:00 to 07:00) in which the electric power unit price is low.

FIG. 6(c) is a diagram illustrating predicted values of the residual stored heat quantity and measured values of the residual stored heat quantity. As indicated by a solid line in FIG. 6(c), the measured values of the residual stored heat quantity in the heat storage tank 213 increase in accordance with the operation plan. In the heat storing operation, the temperature interface S (see FIG. 1) between cold water of a relatively low temperature (for example, 5° C.) and cold water of a relatively high temperature (for example, 12° C.) rises slowly.

The cold heat quantity per unit time $Q_1$ which is supplied from the refrigerator 211a or the like to the heat storage tank 213 and the cold heat quantity per unit time $Q_2$ which is supplied from the heat storage tank 213 to the consuming facility F are expressed by (Expression 1) and (Expression 2). Here, $\rho_w$ [kg/m$^3$] denotes the density of cold water, and $C_{Pw}$ [J/(kg.° C.)] denotes the specific heat of cold water. $T_s$ [° C.] denotes a transmission temperature of cold water (the detection value of the temperature detector T1), and $T_r$ [° C.]

denotes a return temperature of cold water (the detection value of the temperature detector T2). $W_1$ [m³/s] denotes a primary flow rate (a total flow rate from the refrigerator 211a or the like) and $W_2$ [m³/s] denotes a secondary flow rate (a transmission flow rate from the heat storage tank 213 to the consuming facility F).

$$Q_1 = \rho_w \cdot C_{Pw} \cdot W_1 \cdot (T_r - T_s) \quad \text{(Expression 1)}$$

$$Q_2 = \rho_w \cdot C_{Pw} \cdot W_2 \cdot (T_r - T_s) \quad \text{(Expression 2)}$$

The stored heat quantity $Q_T$ to the heat storage tank 213 per unit time (an increase in cold heat) and the radiated heat quantity from the heat storage tank 213 per unit time (a decrease in cold heat) are expressed by (Expression 3).

$$Q_T = -Q_H = Q_1 - Q_2 \quad \text{(Expression 3)}$$

In Step S105 in FIG. 4, the heat source system managing device 100 determines whether an end time of the heat storing operation (for example, see 07:00 in FIG. 6(a)) comes in. When the end time of the heat storing operation comes in (YES in S105), the process of the heat source system managing device 100 moves to Step S106. When the end time of the heat storing operation does not come in (NO in S105), the process of the heat source system managing device 100 returns to Step S104.

In Step S106, the heat source system managing device 100 performs the heat radiating operation on the basis of the operation plan prepared in Step S103. For example, the heat source system managing device 100 operates the refrigerator 211a, the primary cold water pump 212a, and the secondary cold water pump 221 in the time zone from 07:00 to 08:00 (see FIG. 6(a)). Then, cold water cooled by the refrigerator 211a is supplied to the lower part of the heat storage tank 213, and cold water of the same cold heat quantity is supplied from the heat storage tank 213 to the consuming facility F. The cold water of which the temperature has increased by heat consumption in the consuming facility F is returned to the upper part of the heat storage tank 213 via the pipe h5 and is cooled again by the refrigerator 211a or the like.

In step S107 in FIG. 4, the heat source system managing device 100 determines whether a predetermined time Δt1 elapses from the start of the heat radiating operation (or the previous change of the operation plan). The predetermined time Δt1 is a cycle in which the operation plan is changed (S109). In this embodiment, the predetermined time Δt1 is set to one hour.

When the predetermined time Δt1 elapses from the start of the heat radiating operation (YES in S107), the heat source system managing device 100 performs the process of Step S108. When the predetermined time Δt1 does not elapses from the start of the heat radiating operation (NO in S107), the heat source system managing device 100 repeatedly performs the process of Step S107.

FIG. 6(a) is a diagram illustrating a change of the cold heat quantity which is consumed by the consuming facility F in the heat radiating operation. In FIG. 6(a), the current time is 10:00, the "operation history" is set up to 10:00, and the "operation plan" is set subsequent to 10:00. The bold line in FIG. 6(a) indicates a change of the cold heat quantity per unit time which is consumed by the consuming facility F.

In Step S108 in FIG. 4, the heat source system managing device 100 calculates a surplus stored heat quantity using the surplus stored heat quantity calculating unit 1034 (a surplus stored heat quantity calculating step). When the current time is 10:00 as illustrated in FIG. 6(a), the heat source system managing device 100 calculates the surplus stored heat quantity (the area of the hatched part J1) by subtracting the cold heat quantity consumed by the consuming facility F from the predicted heat demand upper limit in the time zone from 09:00 to 10:00. The cold heat quantity consumed by the consuming facility F is calculated on the basis of (Expression 3).

In Step S109, the heat source system managing device 100 changes the operation plan using the operation plan changing unit 1035 (an operation plan changing step).

For example, in the time zone from 09:00 to 10:00 in FIG. 6(a), the surplus stored heat quantity corresponding to a value obtained by subtracting the cold heat quantity consumed by the consuming facility F from the predicted heat demand upper limit remains in the heat storage tank 213 (YES in S109). That is, cold heat more than the residual cold heat quantity at 10:00 which is predicted in the initial operation plan is stored in the heat storage tank 213 (see FIG. 6(c)). The heat source system managing device 100 decreases the number of refrigerators 211a and the like which will operate in the future (decreases the operation rate) to cancel the surplus stored heat quantity.

When changing the operation plan, in what time zone to stop which refrigerator is determined on the basis of ranks 1 to 8 in the operation plan prepared in Step S103. That is, the heat source system managing device 100 changes the operation plan to preferentially stop the refrigerator having the larger generation cost of cold heat. Since the energy consumption characteristics of a refrigerator varies depending on outdoor air temperature or humidity, the rank of the refrigerator to be stopped may be determined again when changing the operation plan.

As illustrated in FIG. 6(a), ranks 1 to 4 are already allocated and the refrigerator 211d is determined to be stopped in the time zones from 10:00 to 14:00. Accordingly, the heat source system managing device 100 changes the operation plan such that the refrigerator 211c operates with a partial load in the time zone 11:00 to 12:00 on the basis of rank 5. That is, the heat source system managing device 100 transfers the surplus stored heat quantity of the hatched part J1 illustrated in FIG. 6(a) to the hatched part J2 to decrease the load factor of the refrigerator 211c. In addition, the load factor of the refrigerator 211c in the time zone from 11:00 to 12:00 is set to generate cold heat corresponding to a value obtained by the surplus stored heat quantity from the cold heat quantity generated in the rated operation.

In this embodiment, the operation plan is changed such that the refrigerator 211c operates with a partial load in the time zone from 11:00 to 12:00 (see FIG. 6(a)), but as another method, the operation plan may be changed such that cold heat corresponding to a value obtained by the surplus stored heat quantity from the cold heat quantity generated in the rated operation of the refrigerators 211a, 211b, and 211c is supplied with the refrigerators 211a, 211b, and 211c set to the same load factor (equal partial loads).

In this way, the heat source system managing device 100 sequentially changes the operation plan to supply cold heat of the predicted heat demand upper limit to the consuming facility F with a margin and to allocate residual cold heat remaining after the consumption in the consuming facility F to stopping of the refrigerator 211d and the like (or operation with a partial load). Accordingly, even when there is heat demand greater than the predicted heat demand value, the cold heat in the heat storage tank 213 does not get insufficient.

The heat source system managing device 100 sequentially changes the operation plan to preferentially stop the refrigerator 211d and the like having the lower generation cost of cold heat on the basis of ranks 1 to 8. Accordingly, it is possible to minimize a cost required for operation of the refrigerator 211d and the like.

Although not illustrated in the flowchart of FIG. 4, for example, in the time zone from 07:00 to 08:00 in FIG. 6(a), the cold heat quantity which is actually consumed by the consuming facility F is substantially equal to the predicted heat demand upper limit. In this way, when the surplus stored heat quantity is very small, the operation plan may not be changed at 08:00.

In Step S110 in FIG. 4, the heat source system managing device 100 performs the changed operation plan. In the example illustrated in FIG. 6(a), when the current time is at 10:00, the operation plan for the time zone from 11:00 to 12:00 is changed. Accordingly, only the refrigerator 211d is stopped as originally scheduled in the time zone from 10:00 to 11:00, and the operation plan which has been changed two times at 10:00 and at 11:00 is performed in the time zone from 11:00 to 12:00 (for example, the refrigerators 211c and 211d are stopped).

In step S111 in FIG. 4, the heat source system managing device 100 determines whether the end time (for example, 24:00) of the heat radiating operation comes in. When the end time of the heat radiating operation comes in (YES in S111), the heat source system managing device 100 ends the process (END). When the end time of the heat radiating operation does not come in (NO in S111), the heat source system managing device 100 performs the process of Step S106 again.

The processes of Steps S106 to S111 are repeatedly performed, for example, every hour. Whenever the operation plan is changed (S109), the number of refrigerator 211d and the like operating is changed to cancel the surplus stored heat quantity.

In the heat radiating operation, the cold heat stored in the heat storage tank 213 is consumed, height of the temperature interface S (see FIG. 1) falls slowly, and the residual stored heat quantity in the heat storage tank 213 is substantially zero when the heat radiating operation ends. This is because the original operation plan is prepared to fully use the cold heat in the heat storage tank 213 (see FIG. 6(a)) and the surplus stored heat quantity is allocated to stopping of the refrigerator 211d and the like in the future.

<Advantages>

According to this embodiment, the operation plan is prepared on the basis of the predicted heat demand upper limit greater than the predicted heat demand value. Cold heat greater than the predicted heat demand value can be supplied to the heat storage tank 213, cold heat which is actually consumed by the consuming facility F can be supplied from the heat storage tank 213 to the consuming facility F, and remaining cold heat can be stored in the heat storage tank 213. Accordingly, for example, when the actual heat demand is greater than the predicted value but is less than the predicted heat demand upper limit, cold heat does not get deficient.

The surplus stored heat quantity which is not consumed but remains in the consuming facility F is allocated to stopping of the refrigerator 211d and the like (or decreasing the load factor) in the future. Accordingly, the residual stored heat quantity in the heat storage tank 213 can be made into substantially zero when the heat radiating operation ends. That is, since the cold heat stored in the heat storage tank 213 can be properly used on the day, it is possible to suppress a radiation loss in the heat storage tank 213.

The heat source system managing device 100 preferentially activate the refrigerator 211a or the like having the lower generation cost of cold heat and preferentially stops the refrigerator 211d or the like having the higher generation cost of cold heat. Accordingly, it is possible to achieve energy saving of the heat source system 200 and to minimize the power cost.

MODIFIED EXAMPLE

While the heat source system managing device 100 according to the invention has been described in conjunction with the embodiment, the invention is not limited to the description but can be modified in various forms.

For example, when changing the operation plan using the operation plan changing unit 1035 (S109 in FIG. 4), the heat source system managing device 100 may adjust the number of refrigerators 211a and the like operating such that the residual stored heat quantity of the heat storage tank 213 is not less than a "residual stored heat quantity lower limit."

The "residual stored heat quantity lower limit" is a lower limit of the residual stored heat quantity for supplying heat of the predicted heat demand upper limit to the consuming facility F and varies with the lapse of time. Specifically, after the current time (for example, 10:00), the cold heat quantity corresponding to the area surrounded with the curve of the predicted heat demand upper limit and the cold heat quantity P1 in FIG. 6(a) is the "residual stored heat quantity lower limit." As described above, by storing cold heat equal to or greater than the "residual stored heat quantity lower limit" in the heat storage tank 213, it is possible to satisfactorily prevent the cold heat in the heat storage tank 213 from being short.

A "radiation loss calculating unit" that calculates a radiation loss in the heat storage tank 213 may be added to the configuration of the heat source system managing device 100. The radiation loss is calculated on the basis of an outdoor air temperature and a temperature distribution of cold water stored in the heat storage tank 213.

The radiation loss per unit time $Q_L$ [W] from the heat storage tank 213 to the outdoor air is expressed by (Expression 4). Here, S [-] denotes a heat storage ratio (stored heat quantity/maximum heat storage capacity), h [W/(m$^{2 \cdot \circ}$ C.)] denotes a heat transmission rate from the heat storage tank 213 to the outdoor air, and $T_o$ [° C.] denotes the outdoor air temperature. $T_c$ [° C.] denotes the temperature of low-temperature cold water stored in the heat storage tank 213, and $T_H$ [° C.] denotes the temperature of high-temperature cold water stored in the heat storage tank 213. $A_c$ [m$^2$] denotes the surface area of a part of the heat storage tank 213 filled with low-temperature cold water and $A_H$ [m$^2$] denotes the surface area of a part of the heat storage tank 213 filled with high-temperature cold water.

$$Q_L = S \cdot h \cdot A_c \cdot (T_o - T_c) + (1-S) \cdot h \cdot A_H \cdot (T_o - T_H) \qquad \text{(Expression 4)}$$

The operation plan preparing unit 1033 prepares the operation plan such that the refrigerator 211a or the like generates heat corresponding to a value obtained by adding the radiation loss $Q_L$ to the predicted heat demand upper limit (S103 in FIG. 4). Accordingly, it is possible to accurately calculate the residual stored heat quantity of the heat storage tank 213 and to properly fully use the cold heat stored in the heat storage tank 213 on the day.

In the embodiment, an example in which there are time zones (from 9:00 to 17:00 in FIG. 6 (a)) in which the predicted demand upper limit is greater than the cold heat quantity P1 (see FIG. 6(a)) has been described above, but the invention is not limited thereto. For example, in a relatively cool season, there may be no time zone in which the predicted demand upper limit is greater than the cold heat quantity P1, but in this case, the operation plan can be prepared and changed in the same ways as described in the embodiment.

In the embodiment, an example in which the heat source system 200 includes four refrigerators 211a to 211d has been described above, but the invention is not limited thereto. That is, the number of refrigerators may be three or less or may be five or more. When the number of refrigerators is one, the heat source system managing device 100 changes the operation plan by decreasing the future load factor (operation rate) of the refrigerator co cancel the surplus stored heat quantity.

In the embodiment, an example in which low-temperature cold water is supplied from the heat storage tank 213 to the consuming facility F to cool the consuming facility F has been described above, but the invention is not limited thereto. That is, in order to cool the consuming facility F, hot heat generated in a heat source device (such as a heat pump, a boiler, or an electric heater) may be stored in the heat storage tank 213 and the hot heat may be supplied to the consuming facility F. Since high-temperature water is stored in the upper part of the heat storage tank 213, hot water circulates in the reverse direction of the direction which has been described in the embodiment (see FIG. 1).

In the embodiment, an example in which the heat medium is water has been described above, but a heat medium other than water may be used.

The invention may be applied to a cloud computing system in which a heat source system managing device 100 exchanges information with a plurality of heat source systems 200 which are installed at base locations via a network may be used.

In the embodiment, the heat source system managing device 100 is applied to an energy network control system, but the invention is not limited thereto. That is, the heat source system managing device 100 may be applied to a cooling/heating control system, and the operation plan may be prepared and changed on the basis of heat demand based on cooling/heating in a predetermined region. The heat source system managing device 100 may be applied to a heat supply plant control system and the operation plan may be prepared and changed on the basis of heat demand of plants such as factories or generators.

The embodiment is described in detail for the purpose of easily understanding the invention, and the invention is not limited to the configuration including all the elements thereof.

In the embodiment, an example in which a program causes the heat source system managing device 100 as a computer to perform a series of processes (see FIG. 4) has been described above, but the invention is not limited thereto. That is, the functions of the elements (see FIG. 2) of the heat source system managing device 100 may be embodied by hardware by designing an integrated circuit or the like. Information such as a program, a table, and a file for embodying the functions may be stored in a storage device such as a memory, a hard disk drive or a solid state drive (SSD) or a recording medium such as an IC card, an SD card, or a DVD.

REFERENCE SIGNS LIST 100 heat source system managing device
103 arithmetic processing unit
1031 heat demand predicting unit
1032 predicted heat demand upper limit calculating unit
1033 operation plan preparing unit
1034 surplus stored heat quantity calculating unit
1035 operation plan changing unit
200 heat source system
211a, 211b, 211c, 211d refrigerator (heat source device)
213 heat storage tank
222 thermal load device (load)
F consuming facility (load)

The invention claimed is:

1. A managing device for improving energy efficiency of a heat source system, comprising:
a plurality of sensors;
one or more heat source devices, and a heat storage tank storing cold heat or hot heat generated by the one or more heat source devices; and
a processor that is communicatively coupled to the plurality of sensors, the one or more heat source devices, and the heat storage tank, wherein the processor:
calculates a predicted heat demand upper limit by adding a predetermined prediction error to a predicted heat demand value for the heat source system, wherein the predicted heat demand upper limit is greater than the predicted heat demand value for the heat source system;
prepares an operation plan of the heat source system to supply heat of the predicted heat demand upper limit to a load of the heat source system;
repeatedly performs, during a plurality of time periods of a day, a process of calculating a surplus stored heat quantity by subtracting a heat quantity consumed by the load in a respective time period from the predicted heat demand upper limit in a heat radiating operation, wherein the heat radiating operation radiates heat from the heat storage tank to the load in accordance with the operation plan; and
on a condition that the surplus stored heat quantity calculated for the respective time period is substantially equivalent to the cold heat consumed in operation, sequentially changes the operation plan by decreasing a future operation rate of the one or more heat source devices for a future time period to cancel the surplus stored heat quantity, thereby improving energy efficiency.

2. The managing device according to claim 1, wherein the heat source system includes two or more heat source devices, and
the processor further calculates a generation cost per unit heat quantity in each time period for each heat source device, and prepares the operation plan to stop the heat source system having a larger generation cost.

3. The managing device according to claim 1, wherein the processor sequentially changes the operation plan to stop a particular heat source device having a larger generation cost per unit heat quantity in each time period when selecting the heat source device to be stopped to cancel the surplus stored heat quantity among two or more heat source devices.

4. The managing device according to claim 1, wherein the processor calculates a radiation loss in the heat storage tank based on an outdoor air temperature and a temperature distribution of a heat medium stored in the heat storage tank, and
wherein the processor prepares the operation plan such that heat obtained by adding the radiation loss to the predicted heat demand upper limit is generated by the one or more heat source devices.

5. A method for improving energy efficiency of a heat source system, implemented in a processor communicatively coupled with a plurality of sensors, the method comprising:

calculating, by the processor, a predicted heat demand upper limit by adding a predetermined prediction error to a predicted heat demand value for the heat source system, wherein the predicted heat demand upper limit is greater than the predicted heat demand for the heat source system;

preparing, by the processor, an operation plan of the heat source system to supply heat of the predicted heat demand upper limit to a load of the heat source system, wherein the heat source system includes one or more heat source devices and a heat storage tank storing cold heat or hot heat generated by the one or more heat source devices;

repeatedly performing, by the processor, a process of calculating a surplus stored heat quantity for a plurality of time periods of a day, wherein the surplus stored heat quantity is calculated by subtracting a heat quantity consumed by the load from the predicted heat demand upper limit in a heat radiating operation, wherein the heat raiding operation radiates heat from the heat storage tank to the load in accordance with the operation plan; and on a condition that the surplus stored heat quantity calculated for the respective time is substantially equivalent to the cold heat consumed in operation, sequentially changing, by the processor, the operation plan by decreasing a future operation rate of the one or more heat source devices for a future time period to cancel the surplus stored heat quantity, thereby improving energy efficiency.

* * * * *